United States Patent

[11] 3,624,602

| [72] | Inventor | Herbert C. Le Doux |
| | | 136 Seaman Ave., New York, N.Y. 10034 |
| [21] | Appl. No. | 10,156 |
| [22] | Filed | Feb. 10, 1970 |
| [45] | Patented | Nov. 30, 1971 |

[54] DECOY ANTI-CAR-THEFT SYSTEM
1 Claim, 13 Drawing Figs.

[52] U.S. Cl.................................................. 340/63,
307/10, 200/42
[51] Int. Cl............................................. G08b 13/00,
B60r 25/00
[50] Field of Search........................................ 340/63, 64,
65; 307/10; 200/42, 43, 44

[56] References Cited
UNITED STATES PATENTS

| 1,269,744 | 6/1918 | Riley | 340/64 |
| 2,583,752 | 1/1952 | Smith | 340/64 |
| 3,058,092 | 10/1962 | Johnson | 340/64 |
| 2,517,619 | 8/1950 | Ainley | 340/63 |
| 3,430,058 | 2/1969 | Yoshida | 340/64 X |

Primary Examiner—Alvin H. Waring
Attorney—Carl Miller

ABSTRACT: An accessory assembly for an automotive vehicle for prevention of car theft, the device comprising a unit mounted on the dashboard and another unit mounted in the engine compartment, each of the units having a manually operated selector switch for closing in series an electrical circuit between the vehicle power battery and the vehicle starter, and each of the selector switch units having a relatively large number of selector switch positions so to increase the improbability of aligning the correct positions so to close the circuit.

INVENTOR
HERBERT C. LE DOUX

Carl Miller
ATTORNEY

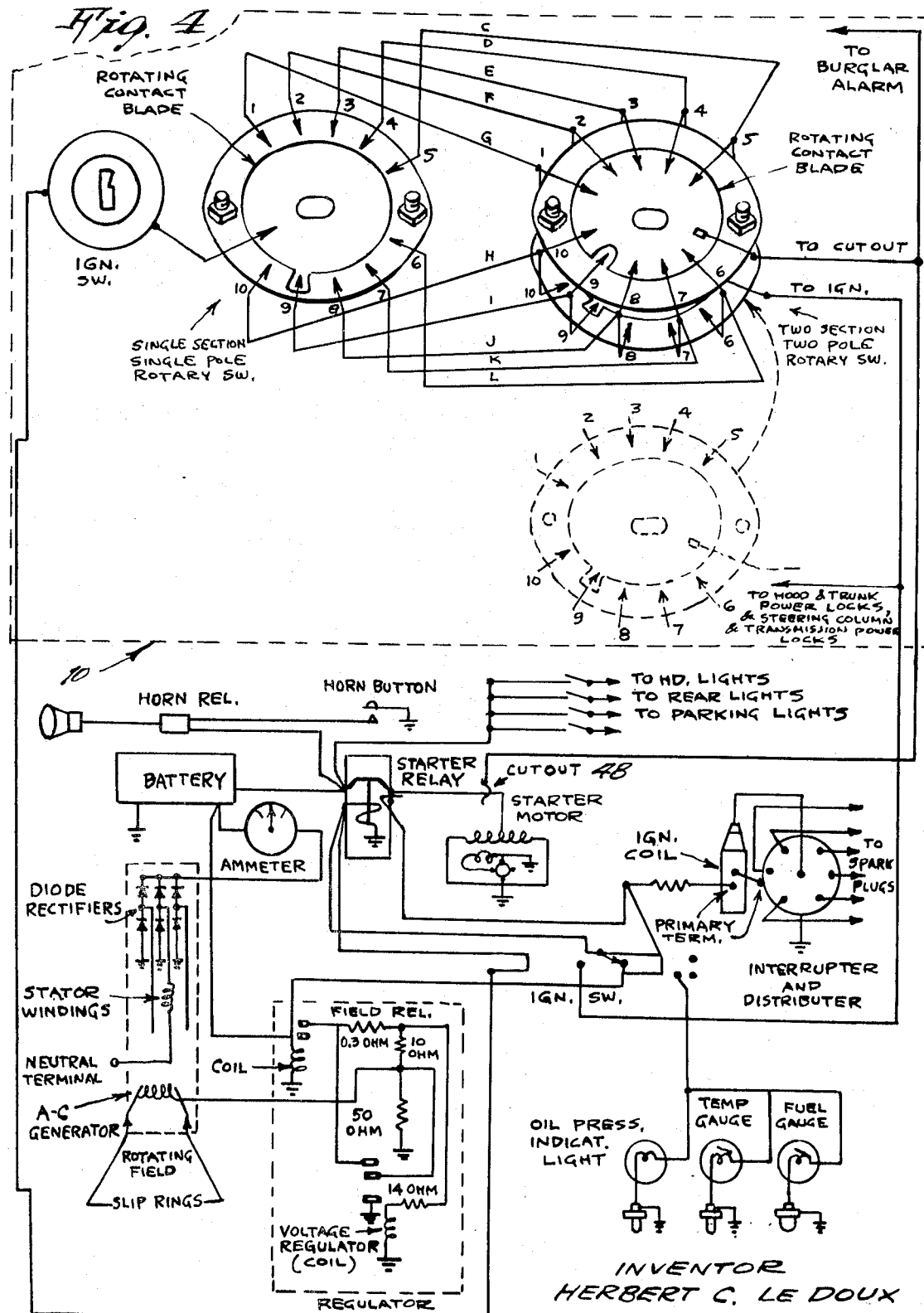

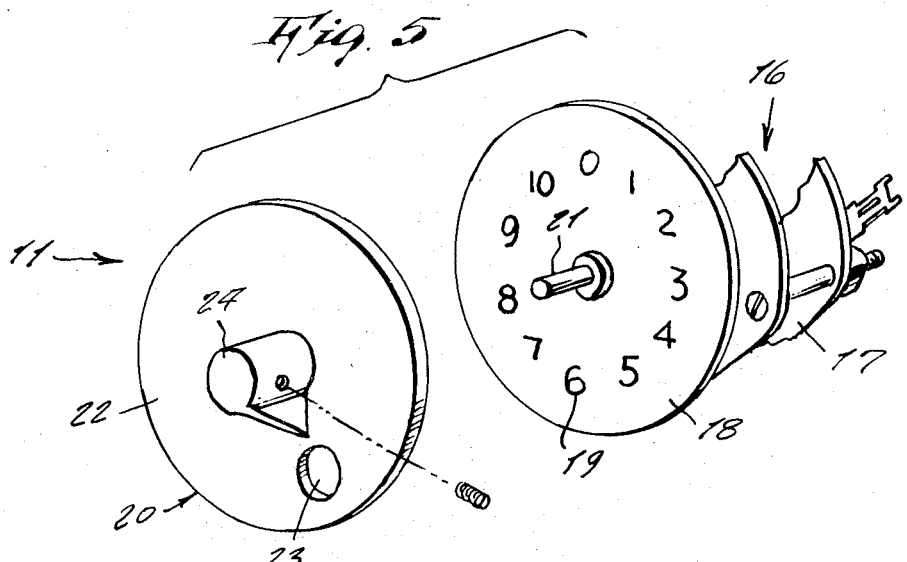
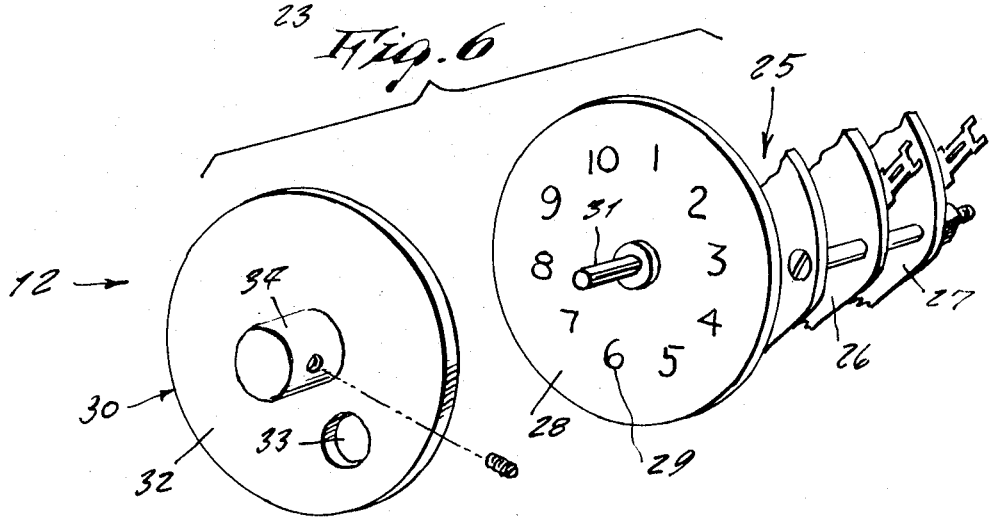
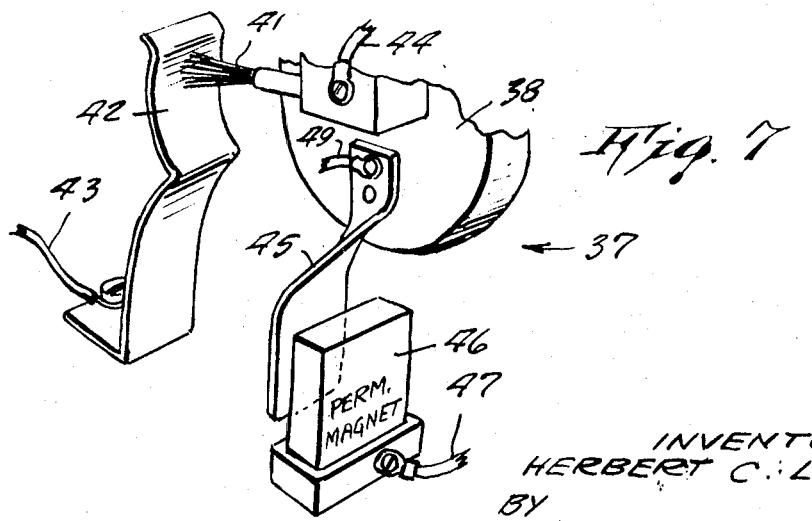

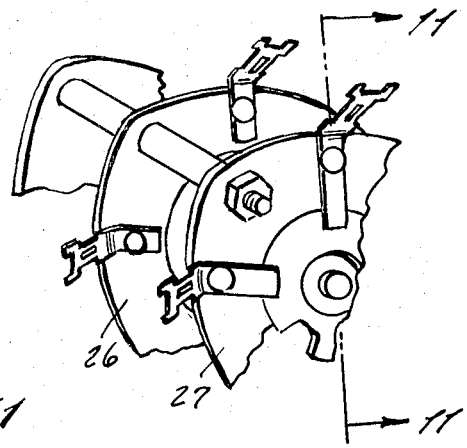
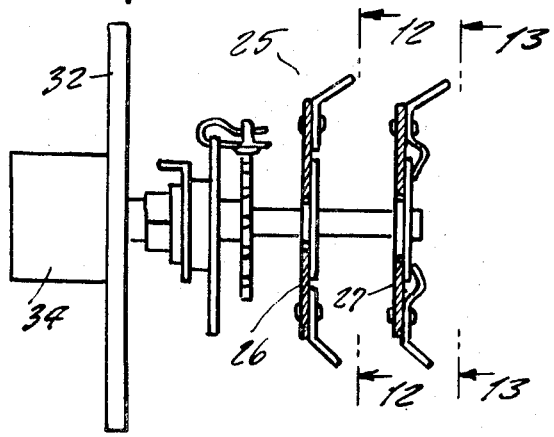
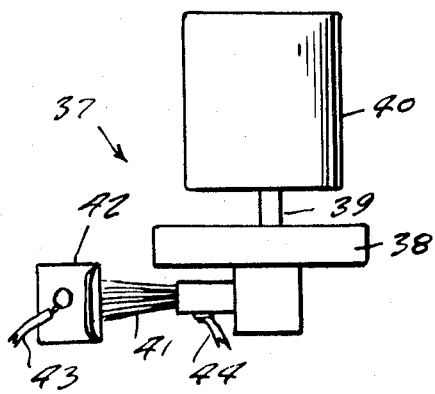
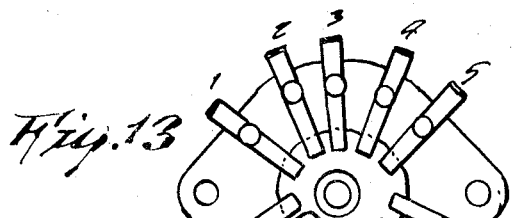
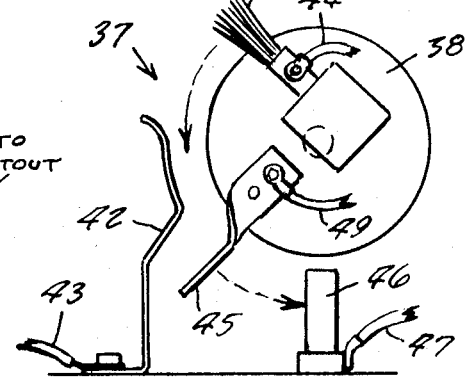
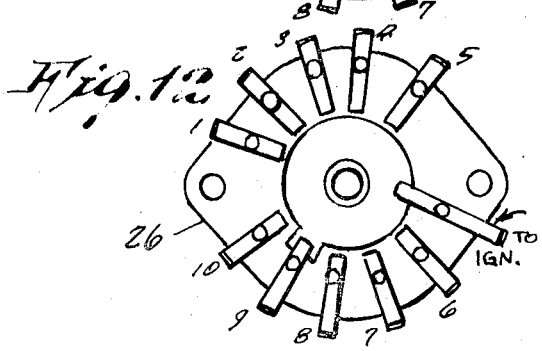

DECOY ANTI-CAR-THEFT SYSTEM

The invention relates generally to automotive accessories. More specifically it relates to automotive vehicle antitheft devices.

A principal object of the present invention is to provide an antitheft device designed to fully confound a thief, by intercepting the vehicle electric starter circuit with an assembly having self-contained means making it difficult for a thief to correctly form an electrical conductor or bridge across the assembly so to close the circuit.

Another object of the present invention is to provide an antitheft device wherein the assembly is divided into a plurality of units which are separated and mounted in different locations on the vehicle so to increase the unlikelihood of a thief to properly align the units electrically.

Another object is to provide an antitheft device wherein one of the units is mounted on the dashboard and the other unit is mounted in the engine compartment, thereby separating the units in areas which thus tend to discourage the thief to necessarily enter both areas of the vehicle.

Yet another object is to provide an antitheft device wherein each of the separated units has a plurality of selector switch positions, each of which must be correctly selected so to form the necessary electrical connection across the assembly.

Yet another object is to provide an antitheft device which can be manufactured as an accessory for being installed in existing vehicles, or which can be incorporated into the original construction of future manufactured vehicles.

Yet a further object is to provide an antitheft device which adds no responsibility or inconvenience to the vehicle operator since the system is entirely automatic.

Yet a further object is to provide an antitheft device that takes up a minimum space.

Other objects are to provide a decoy anti-car-theft system which is simple in design, inexpensive to manufacture, rugged in construction, easy to use and efficient in operation.

These and other objects will be readily evident upon a study of the following specification and the accompanying drawing wherein:

FIG. 4 is an electrical circuit of the invention incorporated into the vehicle electric system.

FIG. 5 is an exploded perspective view of certain components of the dashboard unit.

FIG. 6 is an exploded perspective view of certain components of the under hood or hidden unit.

FIG. 7 is a perspective view of a circuit breaker unit forming a component of the invention, and shown in closed position.

FIG. 8 is top view thereof.

FIG. 9 is a side view thereof shown in an open alternate position.

FIG. 10 is a fragmentary perspective view of the under hood unit selector switch.

FIG. 11 is a side view thereof.

FIG. 12 is a view taken in direction 12—12 of FIG. 11.

FIG. 13 is a view taken in direction 13—13 of FIG. 11.

Figure 1:
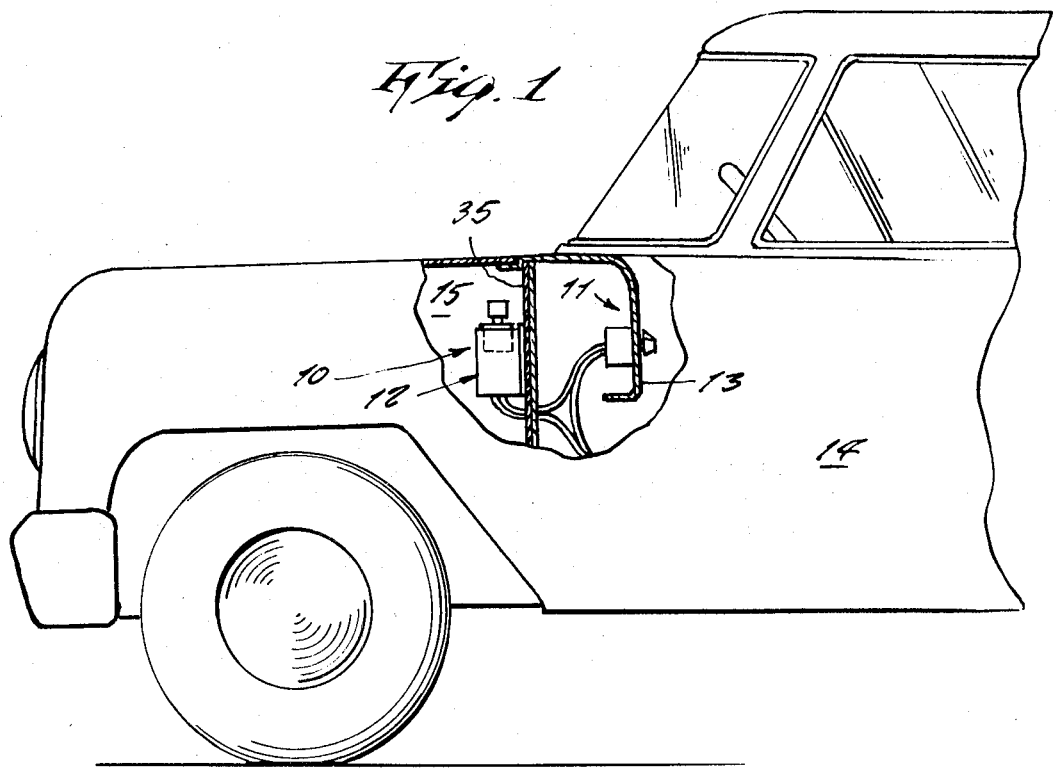
FIG. 1 is a fragmentary side elevation view of an automobile shown partly in cross section so to disclose the present invention mounted therein.

Referring now to the drawing in detail, the reference numeral 10 represents a decoy anti-car-theft system comprising an assembly according to the present invention wherein there is unit 11 and a unit 12; the unit 11 being mounted on the dashboard 13 of a vehicle 14, while the unit 12 is mounted in the engine compartment 15, thereby separating them, so that hat unauthorized entry into either areas does not fully disclose the entire assembly, it being generally known that a vehicle thief wishes to make a quick getaway by entering only the driver's area and not become involved in raising the engine hood so to study how to effect an electrical circuit to the vehicle starter.

The dashboard unit 11 comprises a selector switch mechanism 16 including a single platform 17. The unit includes a fixed dial 18, shown in FIG. 5, the dial being divided into 11 positions as indicated by numerals 19 which read from 0 to 10 inclusive. The unit also includes a rotatable knob 20 that is rigidly affixed on the selector switch stem 21. The knob includes a flat disc 22 of a size which fully covers the dial from view, except for a small opening 23 through the disc which selectively exposes to view one of the numerals 19. The knob also includes a projection 24 for convenient grasp between a person's fingers for rotating the knob.

The under hood unit 12 comprises a selector switch mechanism 25 including two platforms 26 and 27. The unit includes a fixed dial 28, shown in FIG. 6, the dial being divided into 10 positions as indicated by numerals 29 which read from 1 to 10 inclusive. The unit also includes a rotatable knob 30 that is rigidly affixed on the selector switch stem 31. The knob includes, as above described, a flat disc 32 of a size which fully covers the dial face from view, except for the small opening 33 through the disc for selectively exposing one of the numerals 29. The knob also includes the projection 34 for convenient grasp between a person's fingers for rotating the knob.

As shown in FIG. 1, the under hood unit can be mounted on any convenient surface such as the vehicle engine compartment fire wall 35. Cables extend from the two units for electrical interconnection with each other and away to the automobile battery, as is evident in FIG. 1.

Looking now to FIG. 4, it will be noted that the assembly 10 intercepts and fits into the vehicle electric system 36.

The present invention also incorporates a circuit breaker 37, shown in FIGS. 7, 8 and 9, the circuit breaker including a wheel 38 mounted on rotatable shaft 39 supported at one end in member 40. The wheel 38 carries a brush 41 which is able to sweep from the position shown in FIG. 9 to the position shown in FIG. 7, so that the brush electrically contacts a leaf spring 42 connected by conductor 43 to an alarm circuit. The brush is connected by conductor 44 to a power input. The wheel also carries a steel stop plate 45 which abuts with a permanent magnet 46 stationarily mounted, the magnet serving to retain the circuit closed to the alarm. The magnet is connected by conductor 47 to a cut out 48 shown in the circuit of FIG. 4. The plate 45 also is connected by conductor 49 to form input to the cutout.

In summary, it is an established fact any and all key operated locking device are vulnerable. Locksmith advertisements in the Yellow Page telephone directory declare they will open any key operated locking device within minutes. No key operated locking device is employed in the Decoy system.

This all electronic anti-car-theft system defies the skill of the most accomplished car thief. To the amateur or mischievous youth bent on a joy ride this system serves as a deterent even though the key is left in the ignition slot by a careless or forgetful car operator. Breaking the ignition lock to jump the wires serves the thief no purpose since all of the wiring is indistinguishable until it reaches its source beneath the hood. Attempts to gain entrance to the hooded area and trunk by means other than conventional also activates the burglar alarm. To silence the alarm and regain current flow to the starter motor, once the Decoy circuit has been activated, the cutout must be readjusted at its location beneath the hood. Since no key operated locking device is employed in this system the necessity of carrying additional keys and further locking and unlocking for protection is eliminated.

In this invention the dashboard unit serves as a subsidiary ignition switch, and the underhood unit serves as a distributing switch channeling current to the ignition circuit and/or to the cutout and burglar alarm circuit and located in the area beneath the hood of car.

Figure 2:
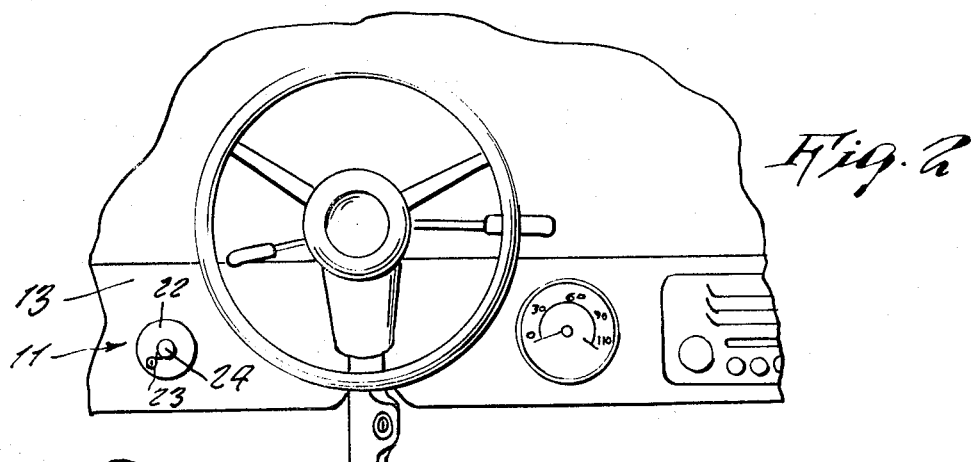
FIG. 2 is a view of the vehicle dashboard showing one unit of the invention incorporated thereon.
Figure 3:
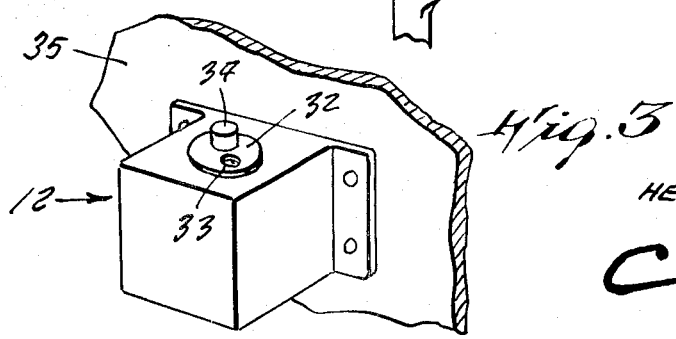
FIG. 3 is a perspective view of a hidden unit mounted on a fire wall within the engine compartment.

The Decoy anti-car-theft circuit is connected in series with the ignition switch to the starting and lighting system at X to Y as illustrated in the diagram sketch. The output cable of the ignition switch is connected to the input contact of the sub ignition control switch A, FIG. 2. Contacts numbered 1 to 10 of switch A, FIG. 2 are individually cabled, as indicated by C to L, to the corresponding numbered contacts of platform section 2B in switch B, FIG. 3 and then on to the corresponding numbered contacts on platform section IB, FIG. 3. The contact blade of section 2B, FIG. 3 is notched while the contact blade of section IB is provided with a lug in aligned sections of the respective blades. Thus the blades, in their circular travel when manually turned, simultaneously opens a contact on platform section 2B thus cutting off current to the blade through this contact while the remaining nine contacts are left closed and closes the corresponding numbered contact on platform section IB thus activating current flow to the blade through this contact while the remaining nine contacts are left open. Output cable connected to the terminal contacting blade of platform section 2B channels current to the burglar alarm and cutout and output cable connection to the terminal contacting blade of platform section IB channels current to the hood and trunk power locks and to the starter motor.

In operation dialing the distributing switch B, FIG. 3 to one of its numbers from 1 to 10 determines the number of the ignition position on the dial of the subsidiary ignition control switch A, FIG. 2. Thus if position 3 is indicated on the distributing switch B dial, number 3 becomes the ignition position on the sub ignition control switch A, FIG. 2 dial while the remaining nine positions are decoys channeled to the alarm and cutout. The above procedure pertains to all ten positions on the switch dials. After adjustment for ignition position has been completed the indicator knob of the distributing switch B is removed so that only the car owner will know the ignition combination. The combination arrangement selected can be permanent or changed as the car owner pleases. To silence the burglar alarm and regain normal current flow to the starter motor, once the Decoy circuit has been activated, the current breaker must be readjusted at its location beneath the hood of car.

Hood and trunk power locks are controlled by the above combination arrangement from the dashboard control panel.

While various changes may be made in the detail construction, it is to be understood that such changes will within the spirit and scope of the present invention as is defined by the appended claims.

I claim:

1. In a antitheft device for an automotive vehicle, the combination of an assembly intercepted into a starter circuit of an automobile, said assembly comprising two separate units mounted in different parts of said vehicle, one of which is mounted on the dashboard control panel and the other mounted under-hood in the engine compartment, and a circuit breaker connected to an alarm; said dashboard unit comprising a single section, single pole, rotary selector switch having a fixed dial in front of which is a rotatable knob affixed on a stem of said selector, the knob including a peripheral flat flange that fully covers said dial from view except for a small eccentric window opening through said flange so to reveal a selected one of numerals on said dial; said under-hood unit comprising a two section, two pole rotary selector switch having a stationary dial covered by a rotatable knob having an eccentrically positioned window opening therethrough for selectively exposing one of a plurality of numerals arranged in a circle on said dial, said knob including a finger-graspable projection with an indicating arrowhead directed toward said opening: and said dashboard unit dial numerals comprising a circle of eleven digits reading from 0 to 10 inclusive, and said under-hood unit dial numerals comprising 10 digits reading from 1 to 10 inclusive.

* * * * *